United States Patent [19]

Richardson

[11] Patent Number: 5,044,846

[45] Date of Patent: Sep. 3, 1991

[54] COMPLIANT TIEDOWN SYSTEM FOR SECURING A CASK FOR TRANSPORTING RADIOACTIVE MATERIALS TO A VEHICLE

[75] Inventor: Raymond V. Richardson, Greensburg, Pa.

[73] Assignee: Westinghouse Electric Corp., Pittsburgh, Pa.

[21] Appl. No.: 485,839

[22] Filed: Feb. 28, 1990

Related U.S. Application Data

[63] Continuation of Ser. No. 181,896, Apr. 15, 1988, abandoned.

[51] Int. Cl.[5] .............................................. B60P 7/12
[52] U.S. Cl. ......................................... 410/47; 410/49
[58] Field of Search ...................... 410/47, 48, 49, 50; 248/146, 154, 313, 316.5, 503

[56] References Cited

U.S. PATENT DOCUMENTS

| | | | |
|---|---|---|---|
| 1,371,436 | 3/1921 | Prichard | 248/313 |
| 2,828,023 | 3/1958 | Berra et al. | |
| 2,851,235 | 9/1958 | Henig | |
| 3,061,255 | 10/1962 | Gallo et al. | |
| 3,084,803 | 4/1963 | Bayers | |
| 3,120,939 | 2/1964 | Himmelberger et al. | |
| 3,999,059 | 12/1976 | Ricks et al. | 410/47 |
| 4,600,169 | 7/1986 | Koster et al. | 410/49 X |
| 4,685,846 | 8/1987 | Golay et al. | |
| 4,714,228 | 12/1987 | Blaushild | |

FOREIGN PATENT DOCUMENTS

| | | | |
|---|---|---|---|
| 22547 | 2/1980 | Japan | 410/47 |
| 57607 | 12/1968 | Luxembourg | |
| 1369949 | 1/1988 | U.S.S.R. | 410/47 |

OTHER PUBLICATIONS

"Development From-Reactor Cask: Legal Weight Truck Cask", vol. II: Technical Proposal Submitted to U.S. Dept. of Energy, Idaho Operations Office, Idaho Falls, ID In Response to RFP. No. DE-RP-07-861D12625, dated 10/31/86, pp. II-30-II-35.
Document Entitled, "Defense High Level Waste (DHLW)/Defense Generated Remote Handled Transuranic Waste (RH TRU) Dual Purpose Case," vol. II: Technical Proposal Submitted to the U.S. Dept. of Energy at Albuquerque, NM, in response to RFP. No. DE-RP04-86AL33569, dated 7/23/86, pp. 34-36, FIGS. 3-6.

Primary Examiner—Margaret A. Focarino
Assistant Examiner—Dean J. Kramer

[57] ABSTRACT

A tiedown system for releasably securing a cask of the type used to transport radioactive waste to a cradle assembly that is mounted onto the deck of a trailer is disclosed herein. The tiedown system includes a trunnion securing assembly for each of the opposing trunnions of the cask, as well as a compliant linkage connected between the trunnion securing assemblies and the cradle assembly for biasing the cask trunnions toward the cradle assembly with a tiedown force that remains substantially constant despite angular displacements of the trunnions which may occur when the trailer traverses rough or uneven roads. The compliant linkage includes a pair of inverted L-shaped levers for each of the opposing trunnion securing assemblies, as well as a tie-bar which is both axially and rotatably movable within a lower portion of the cradle assembly. The end portions of the tie-bar are threaded, one end of each of the levers is pivotally connected to one of the trunnion securing assemblies, while the other end is pivotally connected to an end portion of the tie-bar by way of a threaded coupling. Each of the levers is in turn pivotally connected to the walls of the cradle and configured so as to convert vertical displacements of the cask trunnions caused by rough or uneven roads into horizontal displacements which in turn move the horizontally-oriented tie-bar to and fro, thereby avoiding the generation of localized stresses between the cask trunnions, the cradle assembly and the trailer deck and frame while maintaining a substantially constant tiedown force between the cask and the cradle. The compliant linkage also allows the trunnion securing assemblies to be quickly connected or disconnected from the cask trunnions.

28 Claims, 5 Drawing Sheets

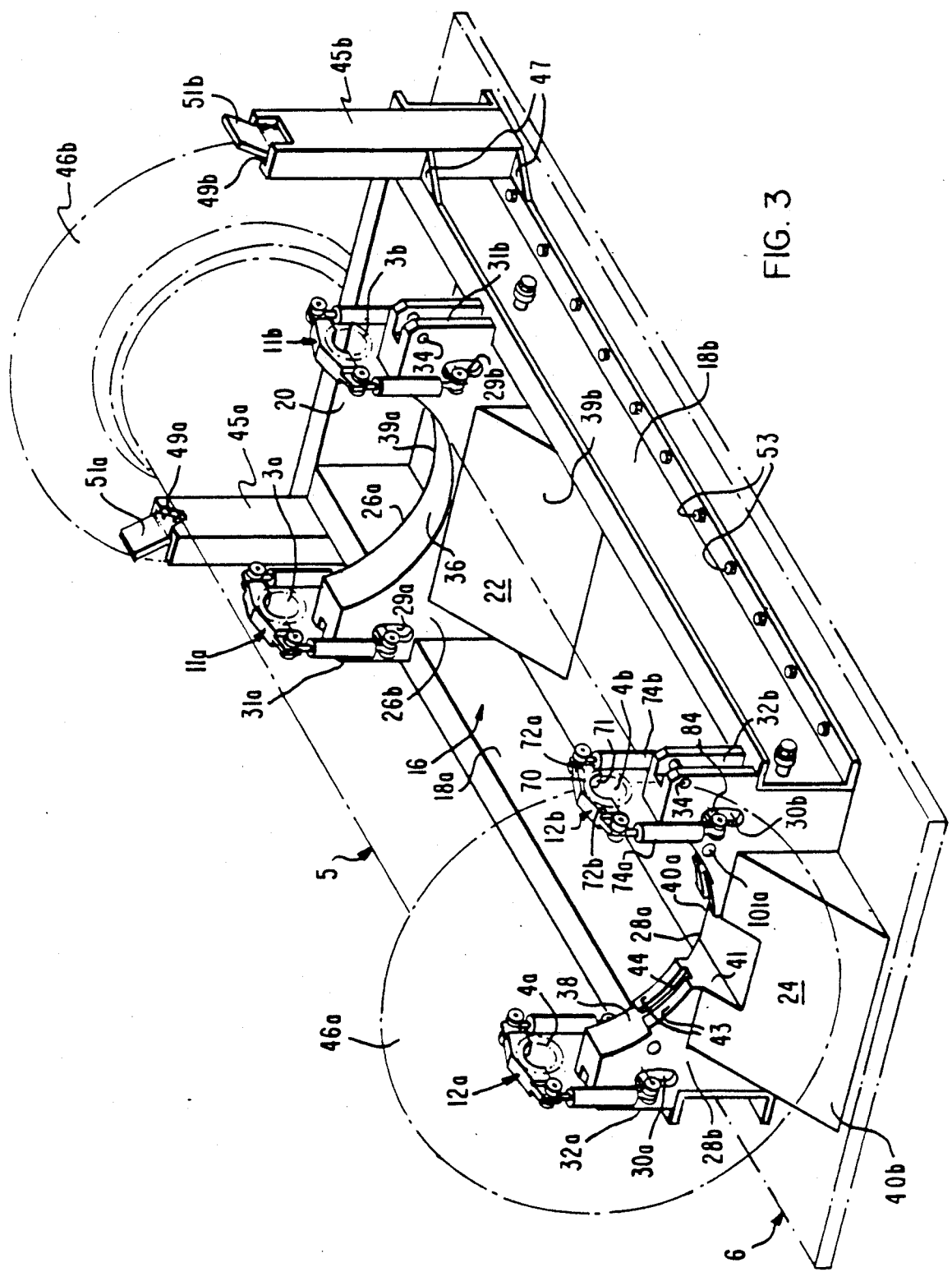

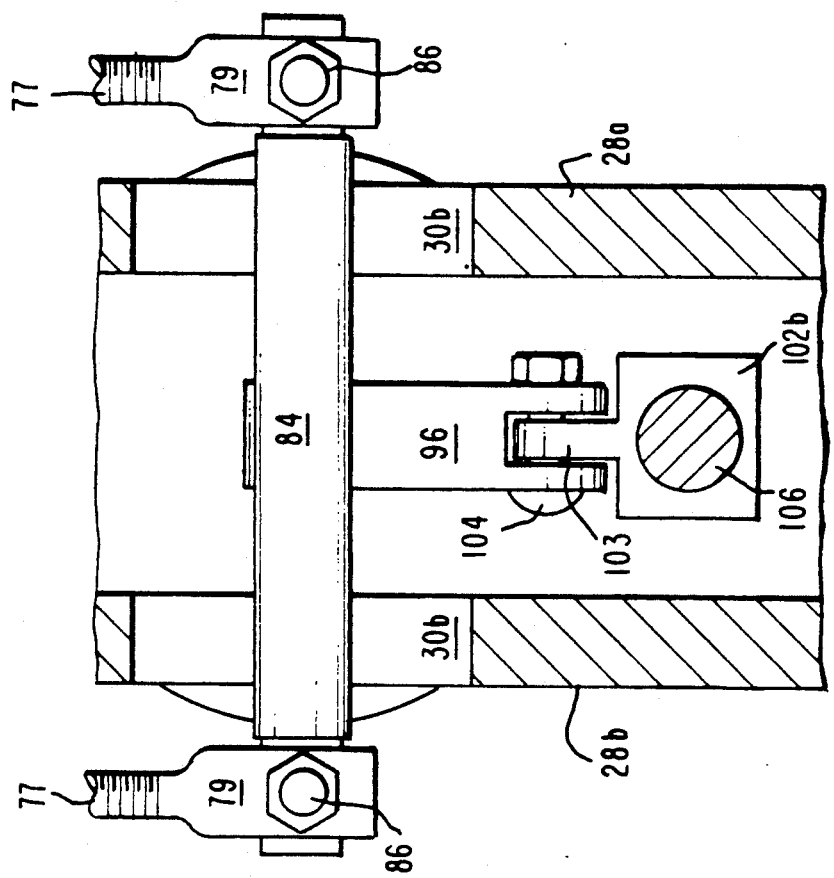
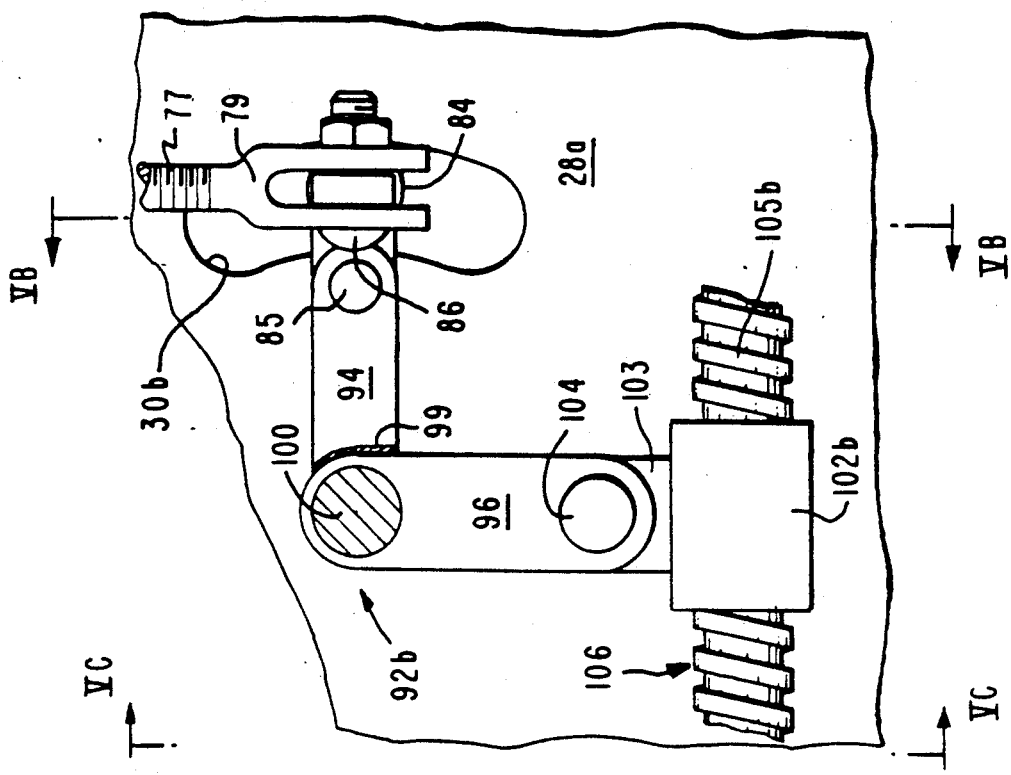
FIG. 5B
FIG. 5A

COMPLIANT TIEDOWN SYSTEM FOR SECURING A CASK FOR TRANSPORTING RADIOACTIVE MATERIALS TO A VEHICLE

This application is a continuation of application Ser. No. 181,896, filed Apr. 15, 1988, now abandoned.

BACKGROUND OF THE INVENTION

This invention generally relates to tiedown systems, and is specifically concerned with a tiedown system for securing a cask that carries radioactive materials onto the trailer of a semi-tractor trailer.

Tiedown systems for securing such casks to the trailers of semi-tractor trailers are known in the art. In one type of system, the cask has a generally elongated, cylindrical shape and is secured on its side within a cradle assembly that is in turn bolted onto the deck of a trailer. The cask typically has at each of its ends a pair of opposing trunnions for mounting purposes. The cradle assembly includes front and back cradle members mounted in a rectangular frame for supporting the two end portions of the cask when the cask is laid upon its side. Each of the cradle members includes an arcuate recess which is complementary in shape to the outer walls of the cylindrical cask, as well as a pair of opposing turnbuckle assemblies that are linked to the cradle member, and are securable to the opposing trunnions of one end of the cask. In operation, the cask is laid sideways with its two ends received within the arcuate recesses of the two cradle members, respectively. The two pairs of opposing trunnions are oriented parallel with the horizontal so that the turnbuckle assemblies may be slipped over the tops of the two opposing pairs of trunnions and tightened down to forceably secure the cask to the cradle assembly.

Industry standards require both the cask and cradle assembly to be strongly secured to the deck and frame of the trailer of a semi-tractor trailer in order to minimize the probability of cask rupture under accident conditions. Specifically, these standards require that the components of the tiedown system should be capable of sustaining forces equivalent to 1.5 to 2.0 times the weight of the cask and its contents along the vertical, longitudinal and traverse axes of the trailer. As a fully loaded type B cask can weigh close to 50,000 pounds, it is clear that each of the component parts of the tiedown system must possess considerable tensile and shear strength if the industry standards are to be met. Hence, prior art tiedown systems have typically included very strong, unyielding trunnions projecting out of the cask walls, turnbuckle assemblies capable of sustaining large amounts of tensile forces, and strong cradle assemblies whose frames are tightly bolted or otherwise affixed to the decks and frames of their respective trailers.

While such tiedown systems are generally capable of safely transporting type B radioactive waste casks, applicant has observed that problems may arise as a result of the overall structural rigidity of such systems. Specifically, when the wheels of the trailers carrying such casks pass over rough or uneven roads and momentarily assume different heights relative to each other, the substantial weight of the cask bearing down on the deck can cause the deck to undergo a significant degree of torsional flexing relative t its direction of travel. The substantial weight of the cask in combination with such torsional flexing can create momentary but very large stresses between the cask trunnions and the turnbuckle assemblies as the sides of the cradle assembly attempt to move relative to the circumference of the cask to accommodate the torsional flexing of the deck below it. Such stresses can also occur between the bolts that tightly mount the frame of the cradle assembly to the trailer deck. These stresses can be large enough to deform local areas of the cradle assembly where the turnbuckle assemblies are linked to the individual cradle members, and to split or otherwise break the frame or deck of the trailer. Over time, these stresses can also induce potentially dangerous amounts of metal fatigue in both the turnbuckle assemblies, and the bolts or other components rigidly affixing the cradle assembly frame to the trailer deck and frame, thereby jeopardizing the ability of the system to handle the G forces associated with industry standards.

Clearly there is a need for a tiedown system which is capable of complying with the G forces set forth by the industry standards, but yet avoids the generation of potentially damaging and dangerous localized stresses. Ideally, such a tiedown system should further be capable of accommodating the displacements of the cask trunnions and other portions of the tiedown system that occur when the trailer traverses uneven road surfaces while maintaining a constant and safe amount of tiedown force between the cask and the cradle assembly. Finally, it would be desirable if the tiedown system were extremely reliable in construction, simple in design, and easily adaptable for use with prior art cradle and cask type systems.

SUMMARY OF THE INVENTION

Generally speaking, the invention is a compliant tiedown system that releasably secures a cask having trunnions to a cradle assembly that in turn is firmly mounted onto the deck and frame of a trailer. The system Comprises a compliant linkage connected between the trunnions of the cask and the cradle assembly for biasing the trunnions against the cradle assembly with a tiedown force that remains substantially constant despite any relative displacement between the trunnions and the cradle assembly that results from the torsional flexing of the trailer deck.

The tiedown system may include opposing trunnion securing assemblies for each of the opposing pairs of trunnions of the cask. Each of these securing assemblies may in turn include a yoke member for detachably securing its respective trunnion to the cradle assembly, a crossbar, and a pair of turnbuckles connected between opposing ends of the yoke member and the crossbar which allows the distance between these components to be adjusted. Each crossbar is linked through an elongated slot in the side of one of the cradle members and is displaceable along the longitudinal axis of its respective slot in response to torsional flexing of the trailer deck.

The compliant linkage may include a pair of vertically oriented opposing lever members and a horizontally oriented tie-bar mounted within the hollow interior of each of the cradle members. Each tie-bar is preferably horizontally and rotatably movable within the lower portion of the cradle member. One end of each of the lever members is connected to the crossbar of one of the trunnion securing assemblies, while the other end is coupled to an end portion of the horizontally movable tie-bar. Each of the lever members may have an inverted L-shape and be pivotally mounted within its respective cradle member at the junction of its two legs so as to convert vertical displacements of the crossbars of the trunnion securing assemblies into horizontal displacements which move the tie-bar horizontally to and fro within the hollow member of the cradle member while at all times maintaining a constant tiedown force between the cask trunnions and the cradle assembly.

In the preferred embodiment, each of the end portions of the tie-bar is threaded with a different-handed thread, and the lower ends of each of the inverted L-shaped levers includes a threaded coupling which is engaged to one of the end portion of the tie-bar and is movable there along in "riding-nut" fashion whenever the tie-bar is rotated. Moreover, because one end of the tie-bar includes a right-handed thread while the other includes a left-handed thread, the bottom legs of the inverted L-shaped levers can be made to pivotally converge or diverge in "skate-key" fashion depending upon whether the tie-bar is rotated clockwise or counterclockwise. Alternatively, only one end of the tie-bar may be threaded. In such an alternate embodiment, only the lower end of one of the inverted L-shaped levers is threadedly engaged to the tie-bar while the end of the other inverted L-shaped lever is rotatably journaled to the other end of the tie-bar between two collars.

The converging or diverging motion of the ends of the inverted L-shaped levers along the ends of the tie-bar allows the system operator to adjust the tiedown force solely by rotating the tie-bar. Moreover, the legs of the L-shaped levers are preferably dimensioned so that the tiedown force may be reduced to zero if desired, thereby allowing the trunnion securing assemblies to be conveniently loosened and released from their respective trunnions without the need for adjusting the turnbuckles thereof.

In short, the tiedown system of the invention avoids the generation of potentially damaging localized stresses on the cradle assembly, trailer deck, trailer frame and bolt mounting therebetween which are caused by the torsional flexing of the trailer deck along its direction of travel. The tiedown system also affords a convenient and expeditious means for adjusting the tiedown force between the cask trunnions and the cradle assembly without the need for adjusting the turnbuckles of the trunnion securing assemblies. The tiedown system is advantageously adaptable to a number of prior art cask carrying systems. Finally, as the inverted L-shaped levers are preferably dimensioned so that the tiedown force may be reduced to zero, the tiedown system of the invention further provides a convenient and expeditious means for removing the trunnion securing assemblies from their respective trunnions without the need for loosening the turnbuckles thereof.

BRIEF DESCRIPTION OF THE SEVERAL FIGURES

FIG. 1 is a side view of the type of cask and semi-tractor trailer that the tiedown system of the invention is preferably used in conjunction with;

FIG. 3 is a perspective view of the cradle assembly that the tiedown system is particularly adapted for use with, wherein the cask and trailer deck is illustrated in phantom so that the details of the cradle assembly may be more easily seen;

FIG. 5A is an enlarged view of the right hand, inverted L-shaped lever of the yieldable suspension illustrated in FIGS. 4A and 5B;

FIG. 5B is a side view of the inverted L-shaped lever illustrated in 5A along the line 5B—5B.

DETAILED DESCRIPTION OF THE PREFERRED EMBODIMENT

Figure 1:
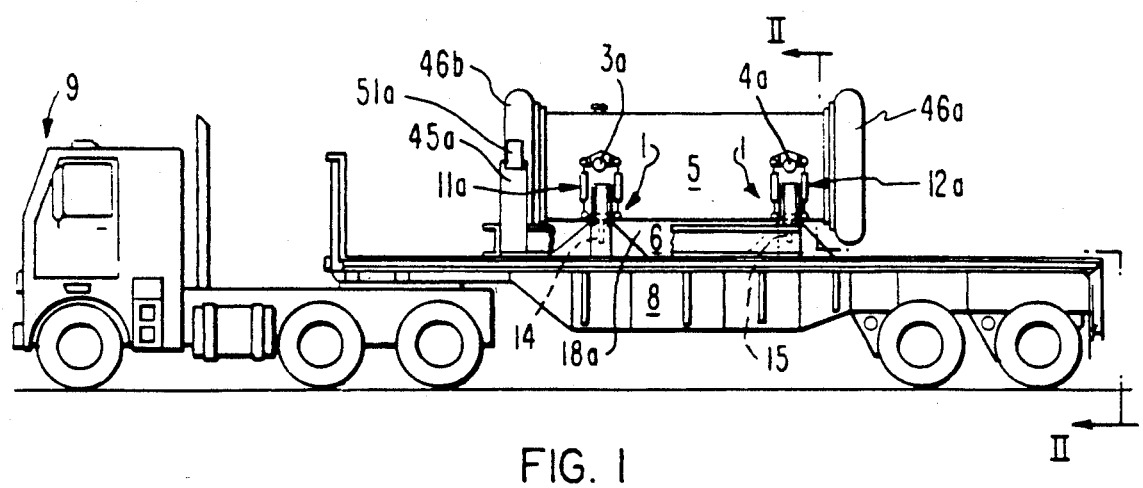
Figure 2:
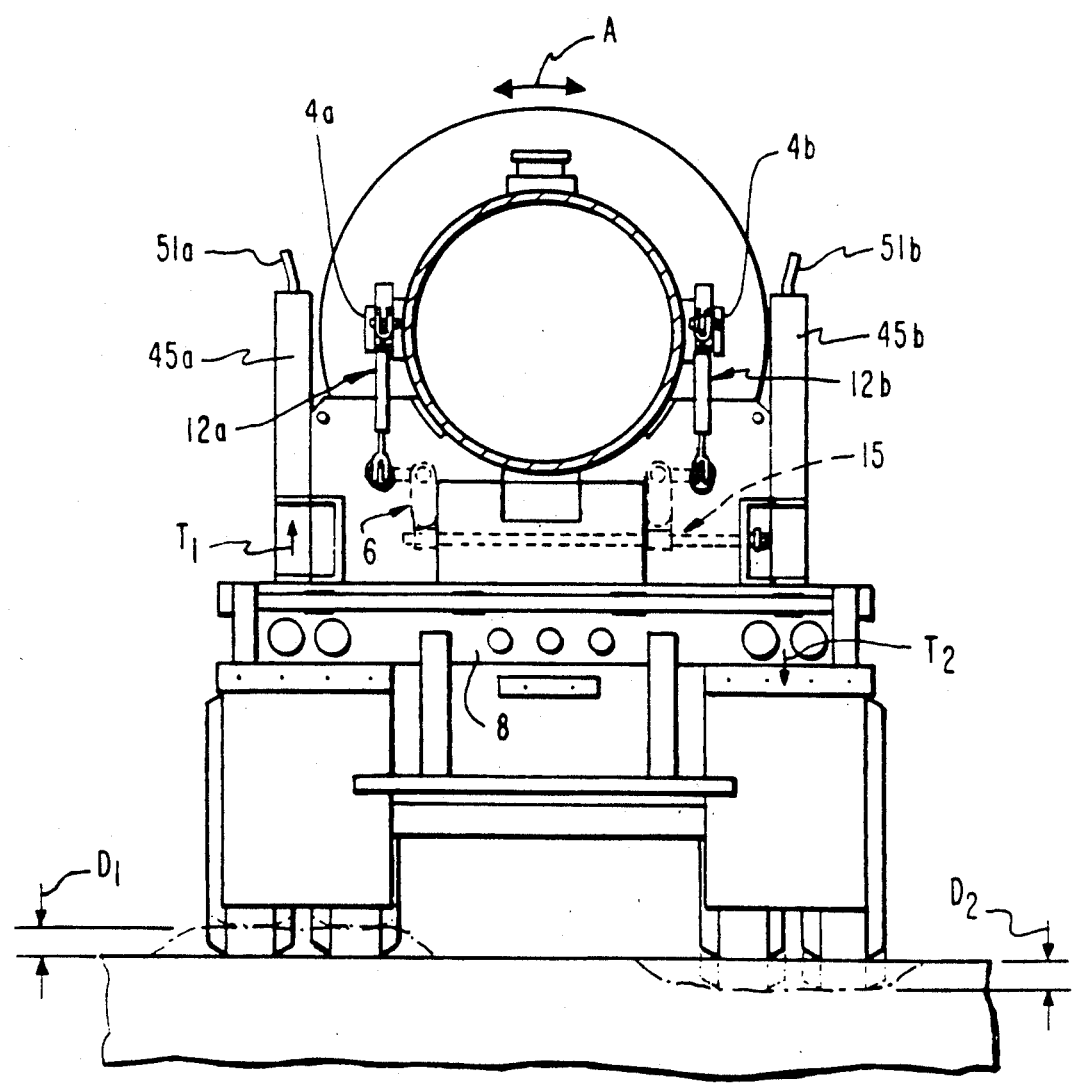
FIG. 2 is an end view of the cask and semi-tractor trailer illustrated in FIG. 1 along the line 2—2, illustrating how nonuniformities in the road surface causes torsional flexing in the deck of the trailer which supports the cask.

With reference now to FIGS. 1 and 2 wherein like figures designate like components throughout all the several figures, the tiedown system 1 of the invention is particularly adapted for securing the front and rear trunnions 3a, 3b and 4a, 4b of a cask 5 of a type used to transport radioactive materials to a novel cradle assembly 6 that is mounted onto the deck of a flatbed trailer 8 of a semi-tractor trailer 9. To this end, the tiedown system 1 generally comprises two components, including front and back pairs of trunnion securing assemblies 11a, 11b and 12a, 12b which are engagable around the opposing front and back pairs of trunnions 3a, 3b and 4a, 4b of the cask 5, as well as front and rear compliant linkages 14 and 15 whose specific structure will be described in detail hereinafter.

The principal purpose of the tiedown system 1 of the invention may best be understood with respect to FIG. 2. As has been previously indicated, the cask 5 is laid sideways over the cradle assembly 6, which is provided with arcuate recesses complementary in shape to the cylindrical body of the cask. The cradle assembly 6 is in turn rigidly bolted along its bottom perimeter to the deck and frame of the flatbed trailer 8. When the wheels of the flatbed trailer 8 are drawn over rough or uneven road surfaces, torsional forces are generated in the deck and frame of the flatbed trailer 8 as a result of the vertical displacements of the two opposing sets of tires of the trailer 8. These torsional forces, although momentary, can be quite severe in a worse case scenario where the right hand pair of wheels strikes a pothole at the same time the left set of wheels strikes a layer of stones or other raised irregularity on the road surface. Under such circumstances, the relative vertical heights of the left hand and right hand pairs of wheels of the trailer 8 will differ by the combined distances D1 and D2. Such height differences will in turn create substantial and opposing torsional forces in the trailer deck and frame indicated by T1 and T2 which will in turn cause the left hand side of the cradle assembly 6 to deflect upwardly while the right hand side deflects downwardly. However, the stiffness of the massive, 50,000 pound cask 5 will cause it to resist the deflections generated in the left and right hand sides of the cradle assembly 6 caused by the momentary twisting of the deck and frame of the trailer 8. In previous arrangements, the end result was the generation of momentary but substantial stresses between crossbars of the trunnion securing assemblies 11a, 11b and 12a, 12b and the portions of the cradle assembly to which they were connected, as well as stresses between the bolted down perimeter of the cradle assembly 6 and the trailer deck. However, as will become evident hereinafter, the tiedown system 1 of the invention avoids the generation of such momentary stresses by the provision of compliant linkages 14 and 15 between the trunnion securing assemblies 11a, 11b and 12a, 12b and the components of the cradle assembly 6 to which they are connected.

Figure 4A:
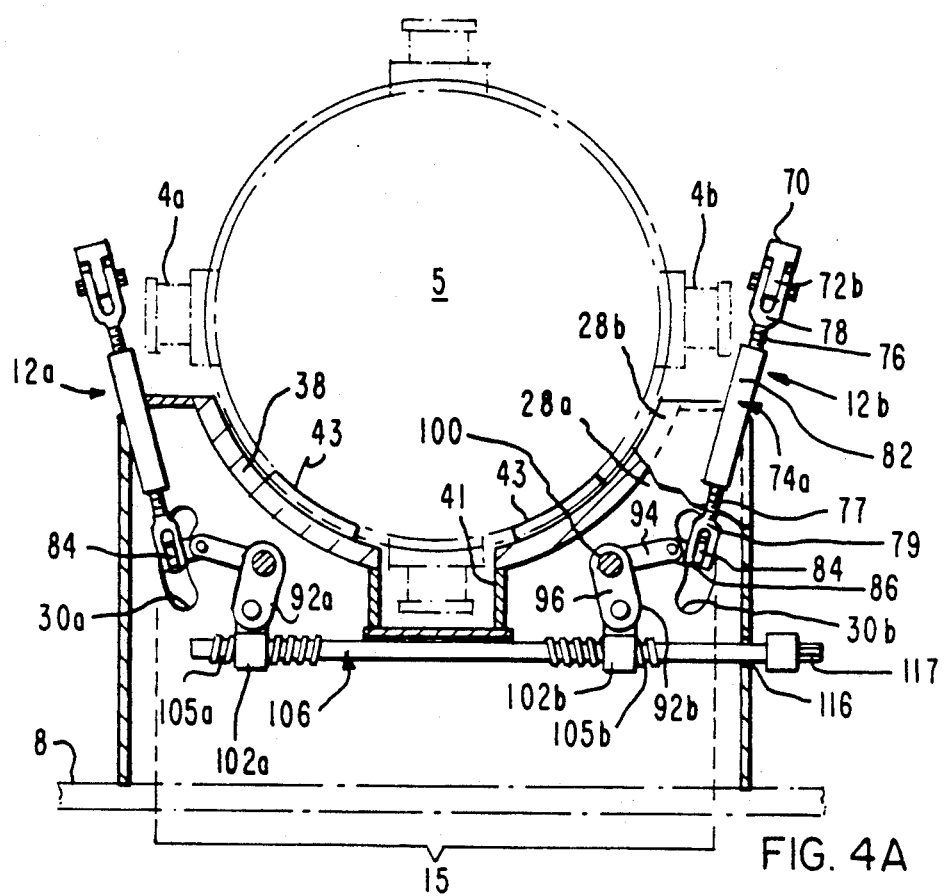
FIGS. 4A and 4B are cross-sectional rear views of the back cradle member of the cradle assembly illustrating the operation of the compliant linkage mounted in the hollow interior of the cradle member.
Figure 4B:
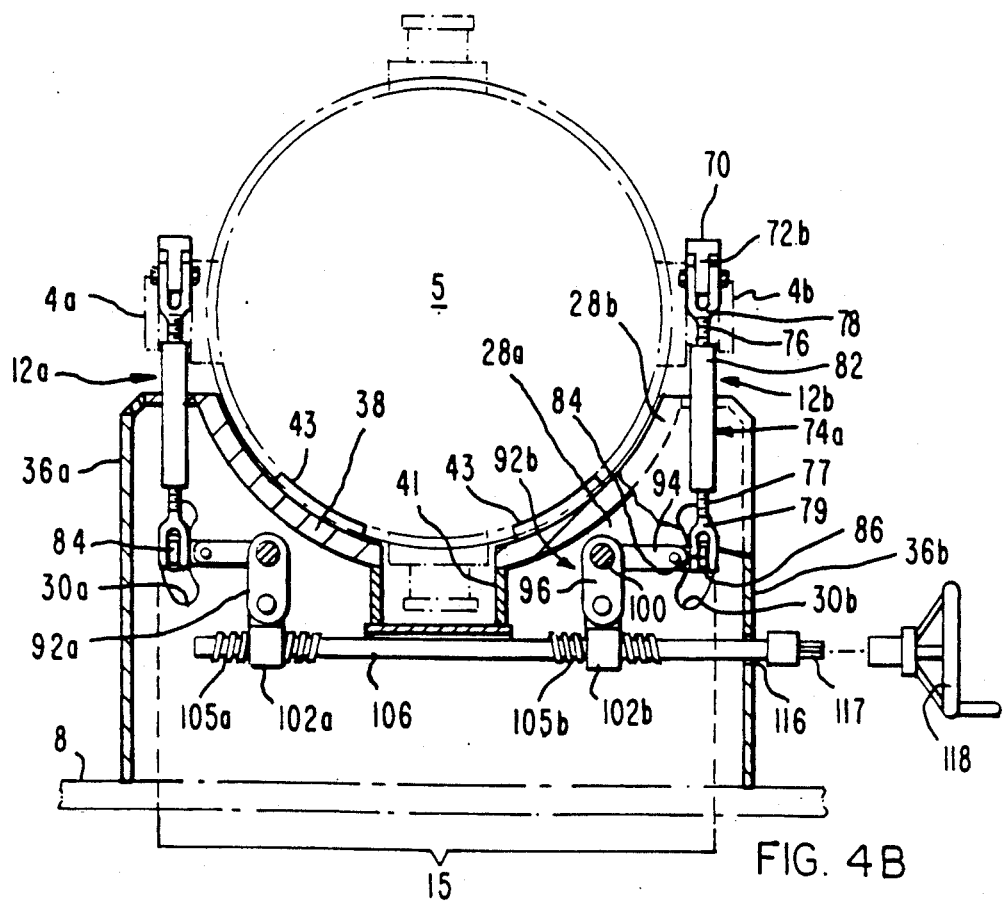

With reference now to FIG. 3, the novel cradle assembly 6 includes a rectangular frame 16 formed from a pair of parallel, side channel beams 18a, 18b and a front channel beam 20. Disposed within the frame 16 is a front cradle 22 and a back cradle 24, each of which includes an arcuate recess in its upper portion that is complementary in shape to the cylindrical body of the cask 5 which it supports. As will be more evident hereinafter, both the front and back cradles 22 and 24 have a generally hollow interior for housing the front and back compliant linkages 14 and 15. Both the front and back cradle 22 and 24 are each generally formed from spaced apart front and rear saddle plates 26a, 26b and 28a, 28b respectively. In the preferred embodiment, these pairs of plates are formed from 6061-T6 aluminum approximately 0.50 inches thick. Each of the pairs of plates 26a, 26b and 28a, 28b further includes elongated slots 29a, 29b and 30a, 30b, respectively, on each side. As is indicated in FIGS. 3, 4A and 4B, these slots 29a, 29b and 30a, 30b are not quite vertically linear, but are slightly arcuate for a purpose which will become evident shortly.

Disposed on either side of the front and rear saddle plates 26a, 26b and 28a, 28b are side lugs 31a, 31b, and 32a, 32b. While these side lugs 31a, 31b and 32a, 32b are indicated as being separate structures in FIG. 3, they may alternatively be formed from side extensions of the front and rear saddle plates 26a, 26b and 28a, 28b of which they abut. Each of these side lugs 31a, 31b and 32a, 32b has a horizontally disposed lug pin 34 as shown for receiving the hooks of a crane (not shown) when it is desired to lift the cradle assembly 6. Just beneath the side lugs 31a, 31b and 32a, 32b and the ends of the channel beams 18a, 18b which abut the front and back cradles 22 and 24 are opposing pairs of side plates 35a, 35b and 36a, 36b. Like the previously discussed front and rear saddle plates, these side plates 35a, 35b and 36a, 36b are formed from 6061-T6 aluminum that is approximately 0.50 inches in thickness. Crowning both of the cradles 22 and 24 are yoke-shaped cradle plates 37 and 38. Both of these top cradle plates 37 and 38 are preferably formed from 6061-T6 aluminum that is approximately 1.50 inches thick in order to insure that the front and back cradles 22 and 24 will have more than enough compressive and shear strength to react the cask 5. To further rigidify the front and back cradles 22 and 24, pyramidal flanges 39a, 39b and 40a, 40b are provided in the front and rear saddle plates 26a, 26b and 28a, 28b, respectively.

Up to this point, the structural components described with respect to the front and back cradle 22 and 24 have been identical. However, it should be noted that the back cradle 24 includes two structural features which are not incorporated into the front cradle 22. The first of these features is the provision of a rectangular recess 40 which allows the back cradle 24 to accommodate a cask having two, orthogonally disposed pairs of opposing trunnions at one of its ends. The second of these features is a keyway 43 which defines a slot 44. The purpose of the slot 44 is to capture a complementary flange (not shown) which circumscribes the back portion of the cask 5 when the cask 5 is laid across the cradle assembly 6. The resulting interfitting engagement between the cask flange and the slot 44 of the keyway 43 reinforces the ability of the cradle assembly 6 as a whole to handle any large shear forces which might result along the longitudinal axis of the cradle assembly 6 as the result of an accident condition. Hence, in contrast to the front cradle 22, the back cradle 24 is capable of securing its respective portion of the cask 5 along three directions (i.e., vertical, longitudinal and transverse with respect to the trailer 8), instead of only two.

Disposed at the front end of the frame 16 of the cradle assembly 6 are a pair of opposing support members 45a, 45b. These support members 45a, 45b are pivotally engagable with trunnions (not shown) which are detachably mountable onto a toroidal impact limiter 46a which circumscribes one end of the cylindrical body of the cask 5. At their bottom ends, each of these support members 45a and 45b is welded onto their respective channel beams 18a, 18b with reinforcing gussets 47 for extra strength. At their upper ends, each of these support members 45a, 45b includes a V-shaped recess 49a, 49b for receiving the previously mentioned, detachably mountable trunnion. Lead-in plates 51a, 51b are provided adjacent to each of the V-shaped recesses 49a, 49b to assist in guiding the detachably mounted trunnions into their respective recesses 49a, 49b. The general purpose of the support members 45a, 45b is to provide a pivot point for receiving and supporting the detachably mountable trunnions so that the cask 5 may be gently lowered down from a vertical position to a horizontal position across the cradle assembly 6 and vice versa. As is clearly indicated in FIG. 3, the cradle assembly 6 is securely mounted to the deck of the flatbed trailer 8 by means of a nut and bolt assemblies 53 spaced along the bottom flanges of each of the side channel beams 18a, 18b.

With reference to FIGS. 3, 4A and 4B, each of the trunnion securing assemblies 11a, 11b and 12a, 12b includes a yoke member 70 having a centrally disposed, semicircular recess 71 for receiving the shaft of one of the trunnions 3a, 3b or 4a, 4b, as well as a pair of opposing arms 72a, 72b. Linked to each of these arms 72a, 72b are turnbuckles 74a, 74b. Each of the turnbuckles includes upper and lower threaded connecting rods 76 and 77. Each of the rods in turn terminates in a mounting fork 78, 79, respectively. Centrally disposed in each of the turnbuckles 74a, 74b is a cylindrical adjustment sleeve 82 which is internally threaded with right and left-handed threads for engaging the threaded connecting rods 76 and 77. A crossbar 84 is connected across the lower mounting forks 79 of each of the turnbuckles 74a, 74b by means of pin assemblies 86. As is clearly indicated in FIG. 3, 4A and 4B, the crossbar 84 of each of the trunnion securing assemblies 11a, 11b and 12a, 12b is linked through the slots 29a, 29b and 30a, 30b located in the sides of the front and back cradle members 22 and 24.

While it would be possible to secure the opposing pairs of cask trunnions 3a, 3b and 4a, 4b to the cradle assembly 6 by tightening the turnbuckles 74a, 74b in each of the trunnion securing assemblies 11a, 11b and 12a, 12b until their respective crossbars 84 were directly engaged against the upper end of the elongated slots 29a, 29b and 30a, 30b, such a mounting arrangement would unfortunately generate and transmit stresses resulting from torsional deflections in the trailer 8 as its wheels roll over an uneven road surface. To this end, yieldable linkages 14 and 15 are connected between the front trunnion securing assemblies 11a, 11b and the front cradle 22, as well as the back trunnion securing assemblies 12a, 12b and the back cradle 24. Because both of the compliant linkages 14, 15 are identical in structure, only the back linkage 15 will be described in detail in order to avoid unnecessary prolixity.

Figure 5C:
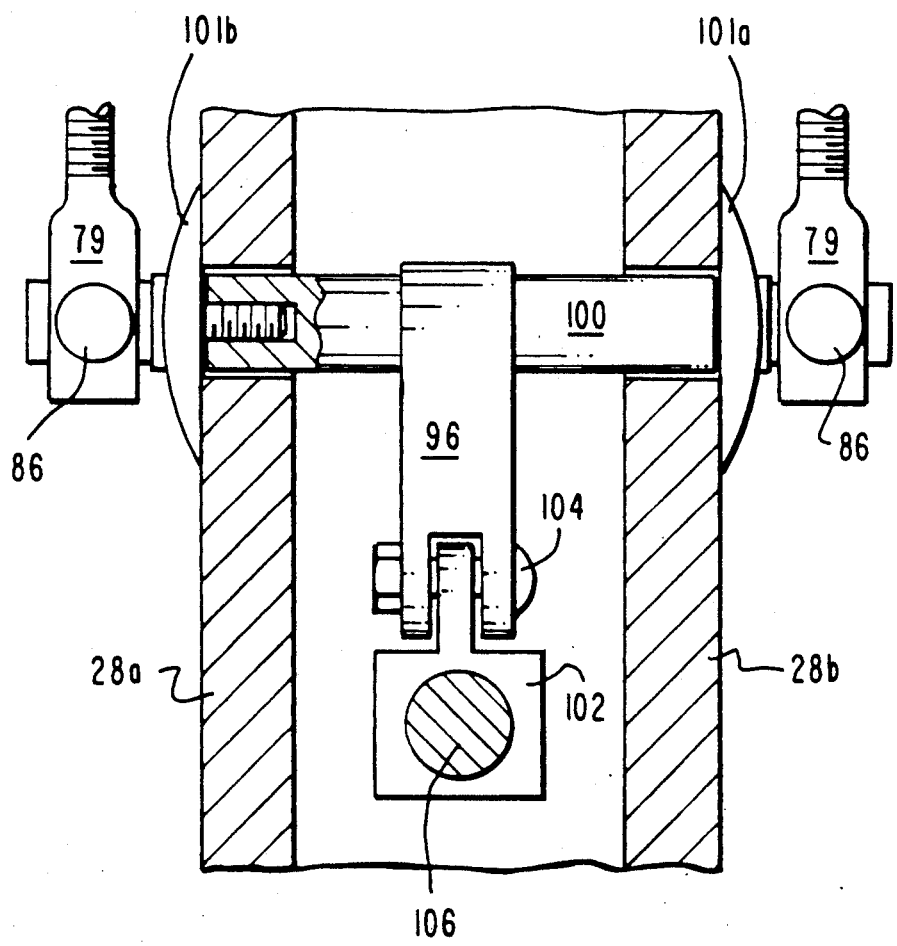
FIG. 5C is a side view of the inverted L-shaped lever illustrated in FIG. 5A along the line 5C—5C.

With reference now to FIGS. 4A, 4B, 5A, 5B and 5C, the compliant linkage 15 includes a pair of opposing, inverted L-shaped connecting levers 92a, 92b. Each of these connecting levers 92a, 92b includes an upper leg 94 whose distal end is pivotally connected to the center of its respective crossbar 84, by pivot pin 85, and a lower leg 96 which terminates in a pin-receiving bore whose purpose will become evident momentarily. Orthogonally extending through the rigidly welded junction 99 between the upper and lower legs 94 and 96 is a pivot bar 100. As is best seen in FIG. 5C, the ends of the pivot bar 100 are journaled in opposing bores present in the front and rear saddle plates 28a, 28b of the back cradle 24. A pair of broad-headed retaining screws 101a, 101b are screwed into the opposing ends of the pivot bar 100 in order to securely maintain it between the plates 28a, 28b. It is important to note that, while the upper and lower legs 94, 96 of each of the levers 92a, 92b cannot pivotally move with respect to each other, the provision of a pivot bar 100 through the joints of each of the levers 92a, 92b allows each lever in its entirety to pivot from the canted position illustrated in FIG. 4A to the vertical position illustrated in FIG. 4B, thereby tightening the trunnion securing assemblies 12a, 12b into engagement over their respective trunnions 4a, 4b in a manner which will be better understood shortly.

A threaded coupling 102a, 102b is pivotally connected to the distal end of the lower legs 96 of each of the inverted L-shaped connecting levers 92a, 92b by means of a connecting pin 104. Pin 104 extends through a bore 97 in the lower leg 96 as well as a bore (not shown) in a rounded lug 103 which projects out of the top surface of the coupling 102. Each of these threaded couplings 102a, 102b is in turn threadedly engaged to the threaded end portions 105a, 105b of a tie-bar 106. In the preferred embodiment, the end portions 105a and 105b are threaded with right and left-handed threads, respectively, so that the couplings 102 of each of the levers will converge or diverge in skate-key fashion when the tie-bar is rotated clockwise or counterclockwise. However, the same mechanical action could be obtained in an arrangement where the tie-bar 106 was threaded on only one end. In this alternate arrangement, the end of one of the inverted L-shaped levers 92a, 92b includes a threaded coupling 102 that is engaged to the one threaded end of the tie-bar 106, while the end of the other inverted L-shaped lever is rotatably connected to the other, unthreaded end of the tie-bar 106 between two collars (not shown) so that the tie-bar 106 can rotate relative to the L-shaped lever, but cannot move horizontally with respect to the lever end. In either embodiment, the right hand end of the tie-bar 106 extends through a bore 116 located in side plate 36b of the back cradle 24 and terminates in a hex nut fitting 117 which may be coupled onto the socket of a handwheel 118 shown in FIG. 4B, or to a torque wrench (not shown).

In operation, when the vehicle operator wishes to secure the trunnion securing assemblies 11a, 11b and 12a, 12b onto the trunnion 3a, 3b and 4a, 4b of the cask 5, he merely slips hexagonal socket of the handwheel 118 over the fitting 114 of the tie-bar 106 of each linkage 14, 15 and rotates the bar 106 counterclockwise until the inverted L-shaped levers 92a, 92b of each linkage 14, 15 are pivoted into the canted position shown in FIG. 4A. The length of the turnbuckles 74a, 74b of each of the trunnion securing assemblies 11a, 11b and 12a, 12b are adjusted so that the yoke members 70 of each may be slipped over their respective trunnions when the levers 92a, 92b are in the position illustrated in FIG. 4A. Once this is accomplished, the vehicle operator merely turns the handwheel 118 clockwise for each linkage until the inverted L-shaped levers 92a, 92b are straightened into the vertical position illustrated in FIG. 4B, thereby pulling down on the crossbars 84 of each trunnion securing assembly 11a, 11b and 12a, 12b which of course draws the yoke members 70 down on the cask trunnions 3a, 3b and 4a, 4b. The elongated slots 29a, 29b and 30a, 30b and the length of the legs 94 and 96 of each of the inverted L-shaped levers 92a, 92b are proportioned so that the tiedown system 1 will be applying a desired amount of tiedown force to the cask trunnions 3a, 3b and 4a, 4b when the crossbars 84 of each of the trunnion securing assemblies 11a, 11b and 12a, 12b are aligned with the axial centers of their respective slots.

When the semi-tractor trailer 9 traverses a rough or otherwise uneven road surface, any torsional flexing in the trailer 8 which causes the crossbars 84 of any pair of opposing trunnion securing assemblies 11a, 11b, or 12a, 12b to displace upwardly or downwardly within its respective slot 29a, 29b or 30a, 30b will be compliantly accommodated by the linkages 14, 15 by a pivoting of the inverted L-shaped levers 92a, 92b and a concurrent horizontal movement of the tie-bar 106. For example, if the torsional flexing should cause the right side of the cradle assembly 6 to flex downwardly and the left hand side to flex upwardly, the linkage 15 would allow the left hand lever 92a to pivot counterclockwise from the vertical position illustrated in FIG. 4B while allowing the right hand lever 92b to pivot counterclockwise. At the same time, the tie-bar 106 would move horizontally along its longitudinal axis toward the right. When the momentary flexing of the trailer 8 and the cradle assembly 6 ends, the two inverted L-shaped levers 92a, 92b and the tie-bar 106 would resume the orientation illustrated in FIG. 4B.

In closing, it should be noted that the retaining forces applied to the trunnion securing assemblies 12a, 12b by the tiedown system 1 remain substantially constant despite the pivoting movements of the inverted L-shaped levers 92a, 92b and the horizontal motion of the tie-bar 106. It should be further noted that, when the operator desires to release the cask 5 from the tiedown system 1, all he need do is reinstall the handwheel 118 on the tie-bars 106 of each linkage 14, 15, and turn the handle counterclockwise until the L-shaped levers are in the canted position illustrated in FIG. 4A.

What is claimed is:

1. A tiedown system for releasably securing a cask having opposing trunnions to a cradle assembly that in turn is mounted onto the deck and frame of a vehicle, wherein said cradle assembly includes at least one cradle member for supporting the weight of the cask, and wherein said cask trunnions are displaceable in opposite vertical directions relative to the cradle member of the cradle assembly when said assembly is torsionally flexed, and said cask rotates relative to said cradle member, about a horizontally oriented axis comprising a compliant linkage means including a tie-bar means operably connected between said trunnions and movably mounted within the cradle assembly for applying a biasing force on each of said trunnions that remains substantially constant despite the opposite vertical displacement of said trunnions relative to the cradle member that results from the torsional flexing of said vehicle deck.

2. A tiedown system as described in claim 1, wherein said compliant linkage means includes lever members operably connected between each of said opposing trunnions and said tie-bar means.

3. A tiedown system as described in claim 2, wherein said tie-bar means is located within said cradle assembly, so that said tie-bar means can move along its longitudinal axis within said cradle assembly in response to displacements of said opposing trunnions caused by the torsional flexing of said floor.

4. A tiedown system as described in claim 2, wherein each of said lever members is movably positionable along the longitudinal axis of said tie-bar means in order to adjust the amount of biasing force said linkage means applies to said opposing trunnions.

5. A tiedown system as described in claim 4, wherein each of said lever members is movable to a position on said tie-bar means wherein said lever members apply no biasing force onto said trunnions in order to facilitate the disconnection of said lever members from said trunnions.

6. A tiedown system as described in claim 3, wherein each of said lever members is pivotally connected to said cradle assembly so that displacements of said trunnions are converted into motions along the longitudinal axis of said tie-bar means which move said tie-bar means with respect to said cradle assembly.

7. A tiedown system as described in claim 2, further including a trunnion securing means for each of said trunnions which is detachably connectable to its respective trunnion, wherein each securing means has a crossbar means that is connected to one end of one of said lever members.

8. A tiedown system as described in claim 7, wherein the crossbar means of each of said trunnion securing means is linked through a slot in said cradle assembly.

9. A tiedown system for releasably securing a cask having opposing trunnions to opposite sides of a cradle assembly that is rigidly mounted onto the deck of a trailer, comprising a compliant linkage means connected between each of said trunnions and said cradle assembly for biasing said trunnions toward the cradle assembly with a biasing force that remains substantially constant despite the displacement of said trunnions that results from the torsional flexing of said trailer floor, said linkage means including at least two lever members and a tie-bar means, wherein each of said lever members is operably connected to one of said opposing trunnions at one end and to said tie-bar means at another end.

10. A tiedown system as described in claim 9, wherein said tie-bar means is connected to said cradle assembly, and each of said lever members is pivotally connected to said cradle assembly so that displacements of said trunnions are converted into forces oriented along the longitudinal axis of said tie-bar means which cause said tie-bar means to move with respect to said cradle assembly, thereby allowing said cask to rotate relative to said cradle assembly while maintaining substantially the same amount of biasing force between said cask and said cradle assembly.

11. A tiedown system as described in claim 9, wherein each of said lever members is movably positionable along the longitudinal axis of said tie-bar means in order to adjust the amount of biasing force said linkage means applies to said opposing trunnions.

12. A tiedown system as described in claim 9, wherein said tie-bar means is rotatably mounted in the cradle assembly, and the end portions of said tie-bar means are threaded, and each of said lever members includes a coupling that is threadedly engaged to the end portions of said tie-bar means such that the positions of the ends of each of the lever members along the end portions of the tie-bar means may be moved by rotating said tie-bar means.

13. A tiedown system as described in claim 12, wherein the end portions of said tie-bar means includes right and left-handed threads, respectively, so that the rotation of the tie-bar means will cause the ends of the lever members coupled thereto to converge or diverge.

14. A tiedown system as described in claim 13, wherein the biasing force that said lever members apply to their respective trunnions increases when said tie-bar means is rotated in such a way as to cause said ends of the lever members coupled thereto to converge.

15. A tiedown system as described in claim 13, wherein the biasing force that said lever members apply to their respective trunnions can be adjusted to zero by rotating said tie-bar means to facilitate the disconnection of the lever members from said trunnions.

16. A tiedown system as described in claim 9, further including trunnion securing means for each of said trunnions which is detachably connectable to its respective trunnion, wherein each securing means has a crossbar means that is connected to one end of one of said lever members.

17. A tiedown system as described in claim 16, wherein the crossbar means of each of said trunnion securing means is linked through a slot in said cradle assembly.

18. A tiedown system as described in claim 12, further including a handwheel for rotating said tie-bar means.

19. A tiedown system for releasably securing a cask having opposing trunnions to opposing sides of a cradle assembly rigidly mounted to the deck and frame of a trailer without the generation of localized stresses on the cradle assembly and deck and the mounting therebetween as a result of torsional flexing of the trailer deck along its direction of travel, comprising: p1 a. a trunnion securing means for detachably connecting each of the opposing trunnions to a side of the cradle assembly, wherein said securing means includes a crossbar means linked through an elongated slot in said cradle assembly and displaceable along the longitudinal axis of said slot, and b. a compliant linkage means operably connected between the crossbar means and the cradle assembly for biasing the crossbar means toward the cradle assembly with a biasing force that remains substantially constant despite displacement of said crossbar means along the longitudinal axis of said slot as a result of the displacement of the cask trunnions caused by the torsional flexing of said trailer deck.

20. A tiedown system as described in claim 19, wherein said linkage means includes a lever member for each of said opposing trunnions and a tie-bar means, and each of said lever members is operably connected to a trunnion at one end and operably connected to the tie-bar means at its other end.

21. A tiedown system as described in claim 20, wherein said tie-bar means is connected to said cradle assembly, and each of said lever members is pivotally connected to said cradle assembly so that displacements of said trunnions are converted into forces oriented along the longitudinal axis of said tie-bar means which cause said tie-bar means to move horizontally with respect to said cradle assembly, thereby allowing said cask to rotate relative to said cradle assembly while maintaining substantially the same amount of biasing force between said cask and said cradle assembly.

22. A tiedown system as described in claim 21, wherein said tie-bar means is rotatably mounted in the cradle assembly, and the end portions of said tie-bar means are threaded, and each of said lever members includes a coupling that is threadedly engaged to the end portions of said tie-bar means such that the positions of the ends of each of the lever members along the end portions of the tie-bar means may be moved by rotating said tie-bar means.

23. A tiedown system as described in claim 22, wherein the end portions of said tie-bar means includes right and left-handed threads, respectively, so that the rotation of the tie-bar means will cause the ends of the lever members coupled thereto to converge or diverge.

24. A tiedown system as described in claim 23, wherein the biasing force that said lever members apply to their respective trunnions increases when said tie-bar means is rotated in such a way as to cause said ends of the lever members coupled thereto to converge.

25. A tiedown system as described in claim 23, wherein the biasing force that said lever members apply to their respective trunnions can be adjusted to zero by rotating said tie-bar means to facilitate the disconnection of the lever members from said trunnions.

26. A tiedown system as described in claim 22, further including a handwheel for rotating said tie-bar means.

27. A tiedown system as described in claim 22, wherein one end of said tie-bar means includes a means for coupling said tie-bar means to a wrench means.

28. A tiedown system for releasably securing a cask having opposing trunnions to opposing sides of a cradle assembly mounted to the deck and frame of a trailer without the generation of localized stresses on the cradle assembly and deck and frame and mounting therebetween as a result of torsional flexing of the trailer deck along its direction of travel, comprising:

a. a trunnion securing means for each of said opposing trunnions for detachably securing said trunnions to the cradle assembly, including a yoke member for engaging said trunnion, a crossbar means linked through an elongated slot in said cradle assembly, and first and second parallel turnbuckles between opposing ends of said yoke member and cross bar means for adjusting the distance therebetween, and b. a compliant linkage means operably connected between the crossbar means and the cradle assembly for biasing the crossbar means and hence its respective trunnion with a biasing force that remains substantially constant despite displacement of said crossbar means along the longitudinal axis of said slot as a result of the displacement of the cask trunnions caused by the torsional flexing of said trailer deck, including a lever member for each of said opposing trunnions and a tie-bar means that is movable with respect to the cradle assembly, wherein each of said lever members is connected to a separate crossbar means at one end and to a separate end portion of said tie-bar means at its other end so as to convert displacements of the crossbar means into sliding movements of said tie-bar means along its longitudinal axis.

* * * * *